US009141064B2

(12) United States Patent
Isoda

(10) Patent No.: US 9,141,064 B2
(45) Date of Patent: Sep. 22, 2015

(54) TONER-AMOUNT DETECTION SENSOR

(71) Applicant: KYOCERA Document Solutions Inc., Osaka-shi (JP)

(72) Inventor: Keisuke Isoda, Osaka (JP)

(73) Assignee: KYOCERA DOCUMENT SOLUTIONS INC., Osaka-shi (JP)

( * ) Notice: Subject to any disclaimer, the term of this patent is extended or adjusted under 35 U.S.C. 154(b) by 0 days.

(21) Appl. No.: 14/326,479

(22) Filed: Jul. 9, 2014

(65) Prior Publication Data

US 2015/0029510 A1 Jan. 29, 2015

(30) Foreign Application Priority Data

Jul. 26, 2013 (JP) ................................ 2013-156132

(51) Int. Cl.
*G01N 21/55* (2014.01)
*G03G 15/00* (2006.01)

(52) U.S. Cl.
CPC .......... *G03G 15/556* (2013.01); *G03G 15/5054* (2013.01)

(58) Field of Classification Search
USPC .................... 356/445; 250/239; 257/433, 434
See application file for complete search history.

(56) References Cited

U.S. PATENT DOCUMENTS

2009/0159788 A1 6/2009 Tang et al.
2012/0189326 A1 7/2012 Yoshida et al.
2013/0164007 A1 6/2013 Yanata

FOREIGN PATENT DOCUMENTS

JP 2005275143 A 10/2005
JP 2006208266 A 8/2006
JP 2008064953 3/2008
JP 2008064953 A 3/2008

OTHER PUBLICATIONS

English Mashine Translation of JP 2008064953A dated Mar. 21, 2008, 9 pages.
EP Search Report issued in the corresponding application No. 14175205.5 dated Oct. 24, 2014.
English abstract and machine translation of JP2005275143A dated Oct. 6, 2005.
English abstract and machine translation of JP2006208266A dated Aug. 10, 2006.

*Primary Examiner* — Tri T Ton

(57) ABSTRACT

A toner-amount detection sensor includes a board, a sensor cover, a light emitter, a light receiver, a light-shielding wall, and two locking parts. The light emitter is surface-mounted on the board. The light receiver is surface-mounted on the board. The light-shielding wall is located between the light emitter and the light receiver, abuts the board, and abuts the sensor cover or extends from the sensor cover. The two locking parts are formed at opposite ends of the sensor cover to press the board to lock it from outside the light emitter and light receiver relative to the light-shielding wall, using the abutment between the light-shielding wall and the board as a supporting point.

5 Claims, 6 Drawing Sheets

TONER-AMOUNT DETECTION SENSOR

INCORPORATION BY REFERENCE

The disclosure of Japanese Patent Application No. 2013-156132 filed on Jul. 26, 2013 including the specification, drawings and abstract is incorporated herein by reference in its entirety.

BACKGROUND

This disclosure relates to a toner-amount detection sensor.

Typical toner detection sensors used in image forming apparatuses, such as printers and multifunction peripheral, are reflective optical sensors each including a light emitter that emits light to toner on an image carrier and a light receiver that receives the reflected light (specularly reflected light and/or diffusely reflected light) to detect the amount of the toner based on the output voltage of the light receiver.

Some of such sensors have the light emitter and light receiver that are surface-mounted on a board.

SUMMARY

A toner-amount detection sensor according to one aspect of the present disclosure includes a board, a sensor cover, a light emitter, a light receiver, a light-shielding wall, and two locking parts. The light emitter is surface-mounted on the board. The light receiver is surface-mounted on the board. The light-shielding wall is located between the light emitter and the light receiver, abuts the board, and abuts the sensor cover or extends from the sensor cover. The two locking parts are formed at opposite ends of the sensor cover to press the board to lock it from outside the light emitter and light receiver relative to the light-shielding wall, using the abutment between the light-shielding wall and the board as a supporting point.

DETAILED DESCRIPTION

With reference to the accompanying drawings, embodiments of the present disclosure will be described below.

First Embodiment

Figure 1:
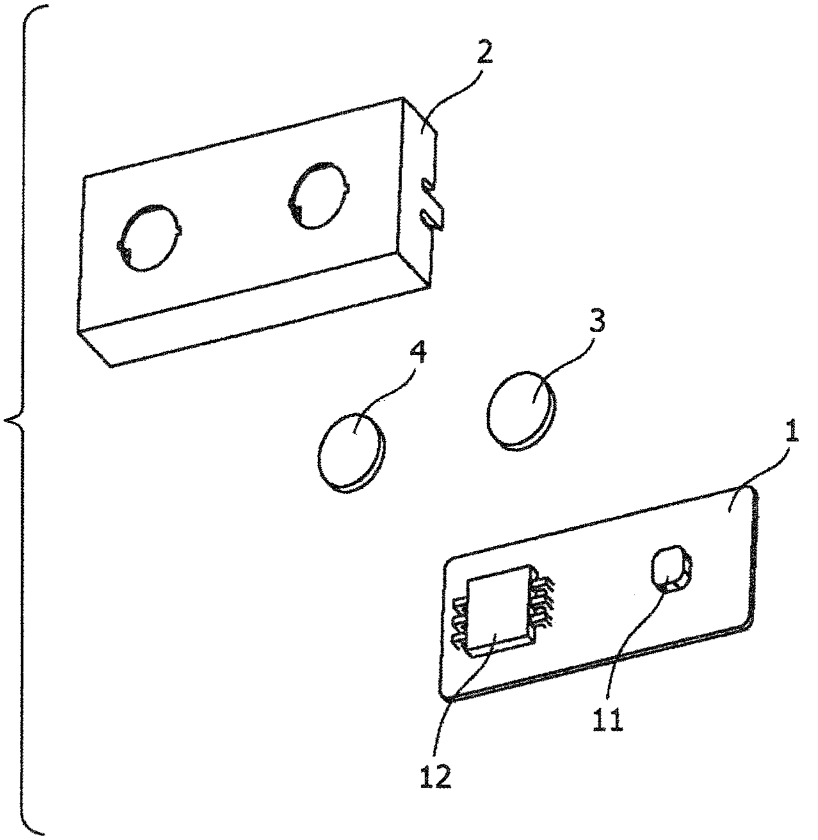
FIG. 1 is an exploded perspective view showing the configuration of a toner-amount detection sensor according to the first embodiment of the present disclosure.
Figure 2:
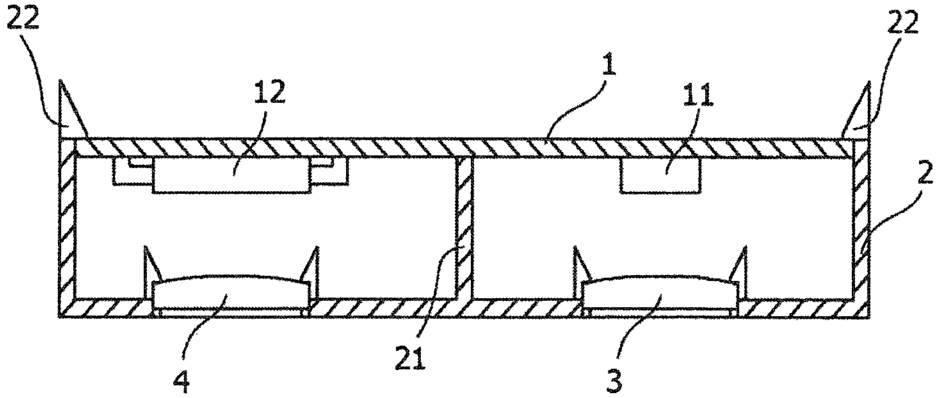
FIG. 2 is a cross-sectional view showing the configuration of the toner-amount detection sensor according to the first embodiment of the disclosure.

FIG. 1 is an exploded perspective view showing the configuration of a toner-amount detection sensor according to the first embodiment of the present disclosure. FIG. 2 is a cross-sectional view showing the configuration of the toner-amount detection sensor according to the first embodiment of the disclosure.

The toner-amount detection sensor shown in FIGS. 1 and 2 includes a light emitter 11 and a light receiver 12, both surface-mounted on a roughly rectangular board 1, and a sensor cover 2 to be attached to the board 1. The sensor cover 2 has two holes to which condenser lenses 3, 4 are fixedly attached so as to face the holes. The light emitter 11 is, for example, a light-emitting diode, and the light receiver 12 is, for example a color sensor element. The condenser lens 3 concentrates the light from the light emitter 11 onto a predetermined toner measurement position, while the condenser lens 4 concentrates the light reflected off the toner measurement position onto the light receiver 12.

The sensor cover 2 is like a box having an opening in roughly the same shape as the board 1 and has the holes in a face opposite to the opening.

A light-shielding wall 21 is provided between the light emitter 11 and light receiver 12. The light-shielding wall 21 can be an independent component separated from the sensor cover 2 or can be an integral part of the sensor cover 2. In this embodiment, the light-shielding wall 21 is integrally formed with the sensor cover 2. The end of the light-shielding wall 21 abuts the board 1.

In the case where the light-shielding wall 21 is separately formed from the sensor cover 2, the light-shielding wall 21 is disposed so as to abut the sensor cover 2.

Two locking claws 22 are formed at opposite ends of the sensor cover 2. The two locking claws 22 press the board 1 to lock it from outside the light emitter 11 and light receiver 12 relative to the light-shielding wall 21, using the abutment between the light-shielding wall 21 and the board 1 as a supporting point. According to this configuration, the amount of warpage at the opposite ends of the board 1 remains the same.

The two locking claws 22 press the board 1 to lock it at the opposite end sides in the longitudinal direction of the board 1.

In addition, the light emitter 11 and light receiver 12 are surface-mounted on the board 1 by reflow soldering.

Reflow soldering performed on the light emitter 11 and light receiver 12 to mount them on a surface of the board 1 heats up the board 1, thereby warping the surface where the light emitter 11 and light receiver 12 are mounted into a convex shape and warping the other surface into a concave shape. The two locking claws 22 press and lock the board 1 so as to correct the warpage.

Figure 3:
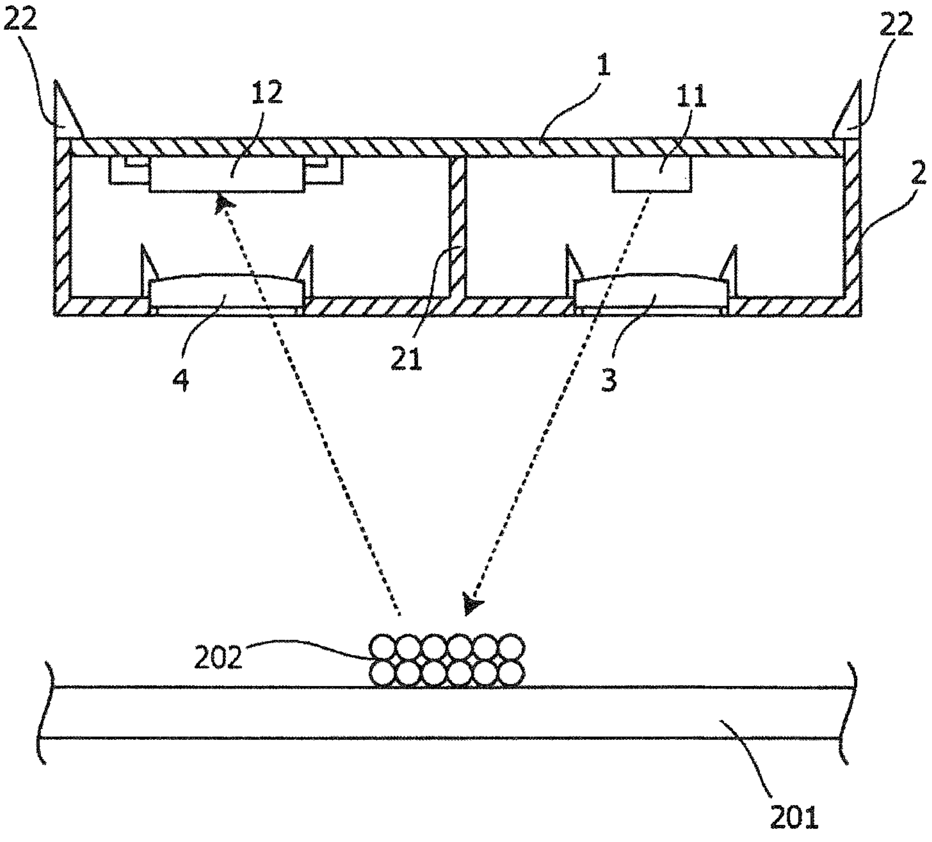
FIG. 3 illustrates how the toner-amount detection sensor according to the first embodiment of the disclosure measures the amount of toner.

FIG. 3 illustrates how the toner-amount detection sensor according to the first embodiment of the disclosure measures the amount of toner.

The toner-amount detection sensor shown in FIGS. 1 and 2 is used to detect the amount of toner 202 on an intermediate transfer belt 201 which is a layered product including an elastic layer. This toner-amount detection sensor requires adjustment of the sensor characteristics, such as optical axis, prior to installation to an image forming apparatus. After adjustment, the toner-amount detection sensor is attached to the image forming apparatus, for example, by screwing the board 1 or sensor cover 2 to the image forming apparatus. After installation to the image forming apparatus, as shown in FIG. 3, light from the light emitter 11 passes through the condenser lens 3 to enter a base layer of the intermediate transfer belt 201 or the toner 202 on the intermediate transfer belt 201, and the reflected light passes through the condenser lens 4 to enter the light receiver 12.

In this embodiment, the optical system of the toner-amount detection sensor is designed so that specularly reflected light passes through the condenser lens 4 to enter the light receiver 12.

Figure 4A:
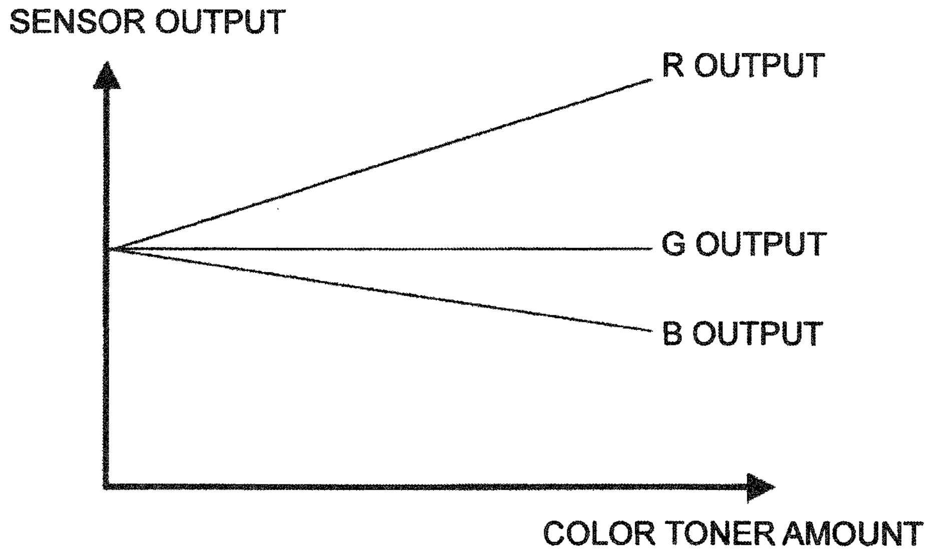
FIG. 4A illustrates an example of output characteristics of the toner-amount detection sensor shown in FIG. 1, and particularly exemplary output characteristics for color toner.
Figure 4B:
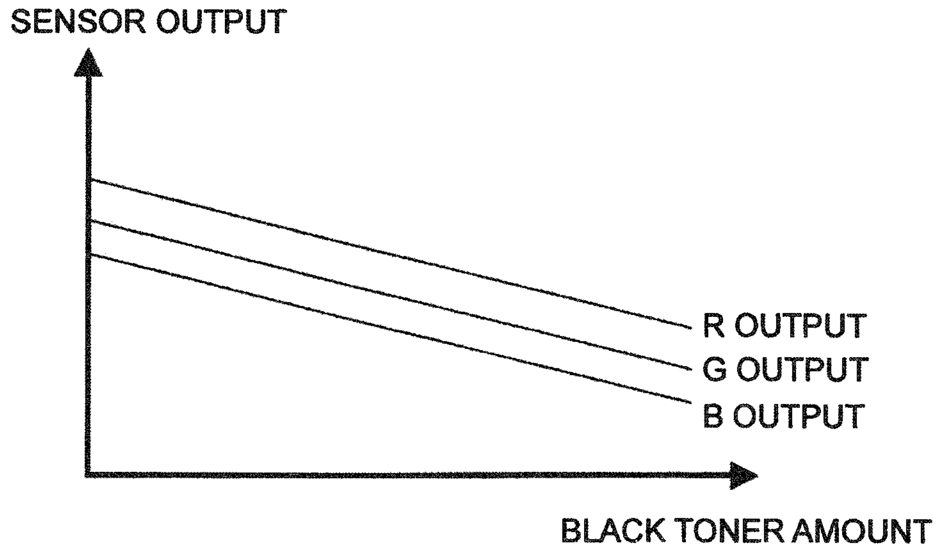
FIG. 4B illustrates an example of output characteristics of the toner-amount detection sensor shown in FIG. 1, and particularly exemplary output characteristics for black toner.

FIGS. 4A and 4B show examples of output characteristics of the toner-amount detection sensor shown in FIG. 1. FIG. 4A shows an example of output characteristics for color toner. FIG. 4B shows an example of output characteristics for black toner. If the light receiver 12 is a color sensor element, the light receiver 12 can provide outputs of respective RGB colors. Because the outputs of the respective RGB colors exhibit roughly the same tendencies, any one of the RGB outputs can be used to detect the amount of black toner. On the other hand, when the amount of color toner (color toner other than black toner) is detected, the output tendencies of the RGB colors are different from each other, and therefore it is preferable to use an output of a color with the highest sensitivity.

According to the above-described first embodiment, the light emitter 11 and light receiver 12 are surface-mounted on the board 1, and the light-shielding wall 21 located between the light emitter 11 and light receiver 12 abuts the board 1 and abuts the sensor cover 2 or extends from the sensor cover 2. The two locking claws 22 that are formed at the opposite ends of the sensor cover 2 press the board 1 to lock it from outside the light emitter 11 and light receiver 12 relative to the light-shielding wall 21, using the abutment between the light-shielding wall 21 and the board 1 as a supporting point.

This configuration can reduce changes in the sensor characteristics caused by changes in warpage of the board 1 between before and after the toner-amount detection sensor is installed in the image forming apparatus, caused by changes in moisture-related warpage of the board 1 of the installed toner-amount detection sensor, and caused by other factors.

Second Embodiment

A toner-amount detection sensor according to the second embodiment is used to detect diffusely reflected light.

Figure 5:
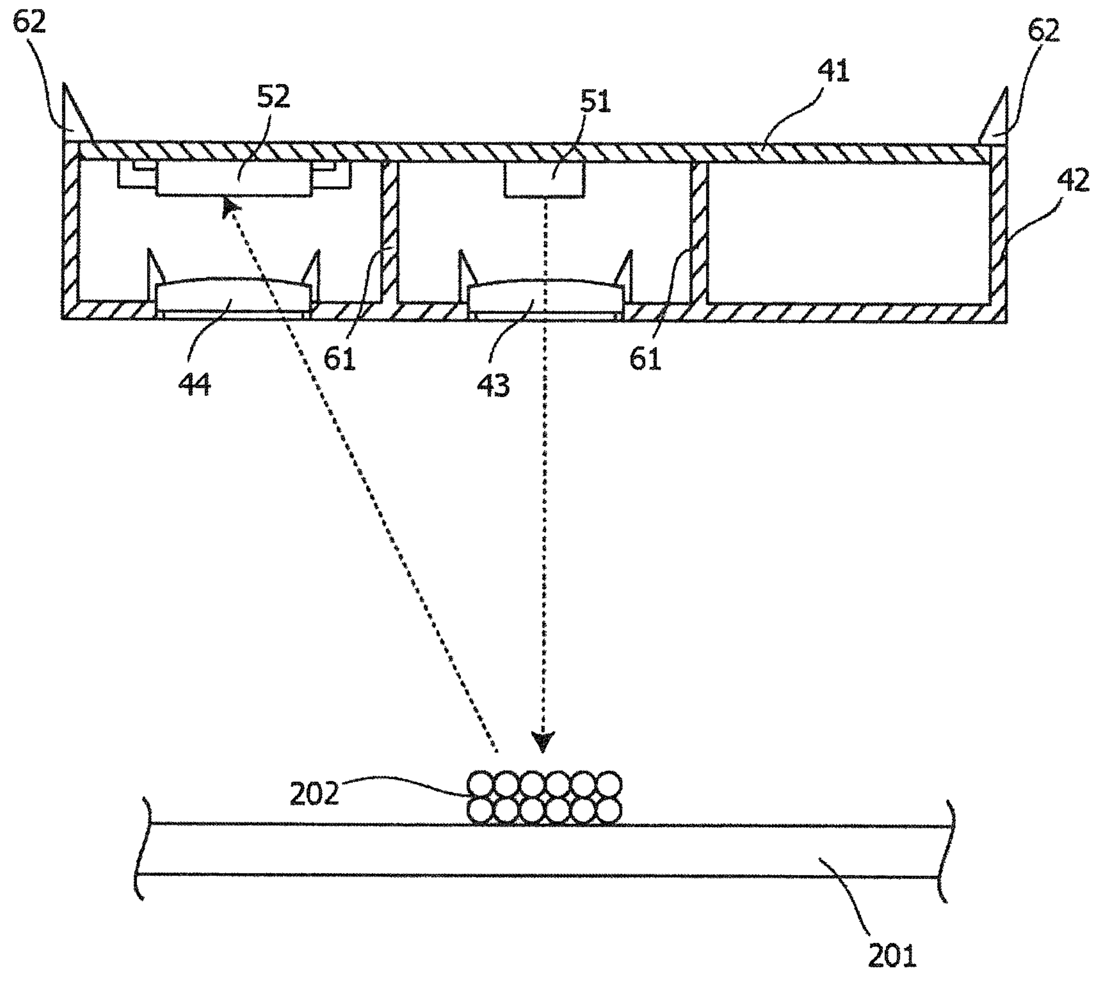
FIG. 5 is a cross-sectional view showing the configuration of a toner-amount detection sensor according to the second embodiment of the present disclosure.

FIG. 5 is a cross-sectional view showing the configuration of the toner-amount detection sensor according to the second embodiment of the present disclosure. The toner-amount detection sensor of the second embodiment includes a light emitter 51 and a light receiver 52 surface-mounted on a board 41 and a sensor cover 42 attached to the board 41 as in the case of the first embodiment. The sensor cover 42 has two holes to which condenser lenses 43, 44 are fixedly attached so as to face the holes.

The sensor cover 42 is like a box having an opening in roughly the same shape as the board 41 and has the holes in a face opposite to the opening.

Light-shielding walls 61 are provided on both sides of the light emitter 51. One of the light-shielding walls 61 is located between the light emitter 51 and the light receiver 52. The light-shielding walls 61 can be independent components separated from the sensor cover 42 or can be integral parts of the sensor cover 42. In this embodiment, the light-shielding walls 61 are integrally formed with the sensor cover 42. The ends of the light-shielding walls 61 abut the board 41.

In the case where the light-shielding walls 61 are separately formed from the sensor cover 42, the light-shielding walls 61 are disposed so as to abut the sensor cover 42.

Two locking claws 62 are formed at opposite ends of the sensor cover 42. The two locking claws 62 press the board 41 to lock it from outside the light emitter 51 and light receiver 52 relative to the light-shielding wall 61 located between the light emitter 51 and light receiver 52, using the abutments between the light-shielding walls 61 and the board 41 as supporting points. According to this configuration, the amount of warpage at the opposite ends of the board 41 remains the same.

The two locking claws 62 press the board 41 to lock it at opposite end sides in the longitudinal direction of the board 41.

In the second embodiment, the optical system of the toner-amount detection sensor is designed so that light from the light emitter 51 almost perpendicularly enters toner 202 on the intermediate transfer belt 201 and the diffusely reflected light with a predetermined reflection angle enters the light receiver 52.

Third Embodiment

A toner-amount detection sensor according to the third embodiment is used to detect diffusely reflected light.

Figure 6:
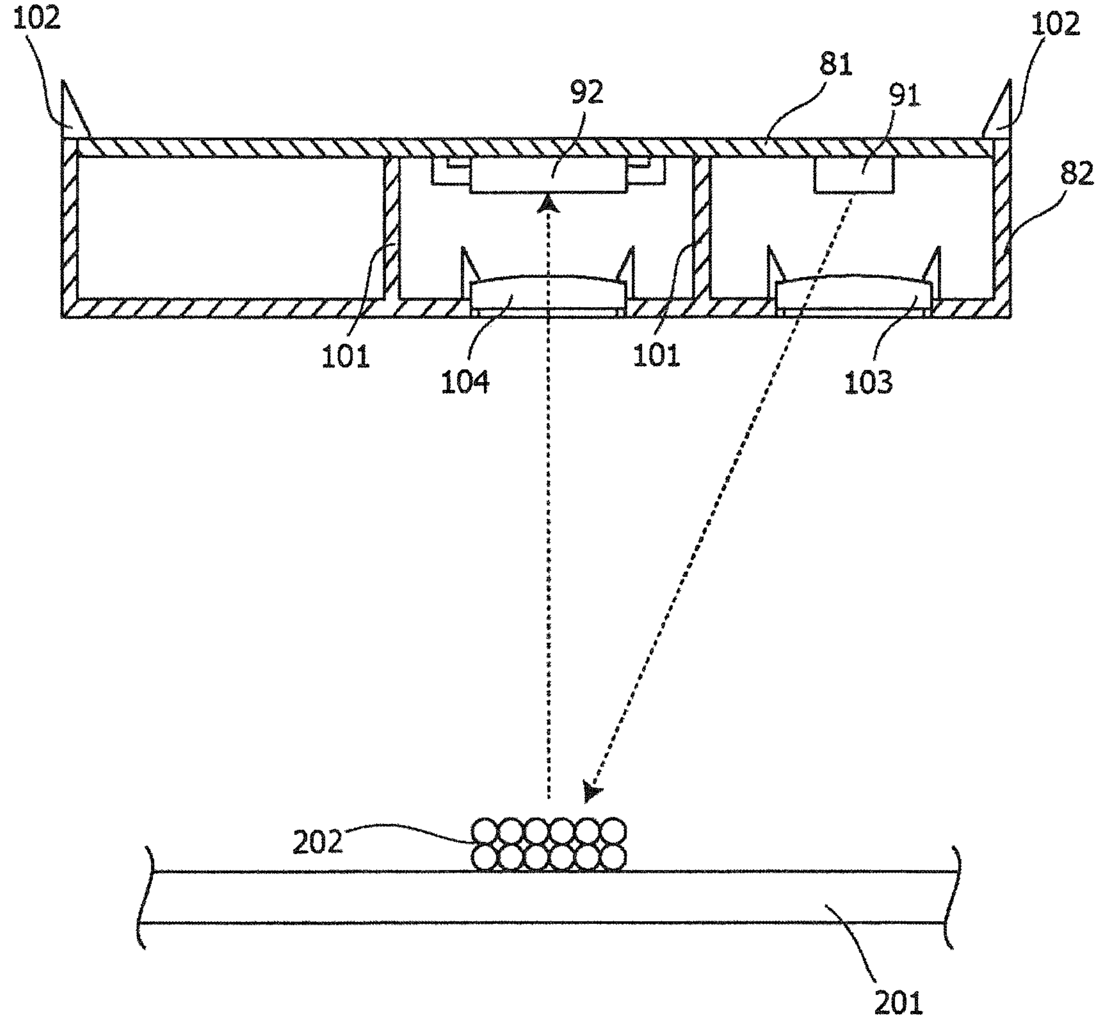
FIG. 6 is a cross-sectional view showing the configuration of a toner-amount detection sensor according to the third embodiment of the present disclosure.

FIG. 6 is a cross-sectional view showing the configuration of the toner-amount detection sensor according to the third embodiment of the present disclosure. The toner-amount detection sensor of the third embodiment includes a light emitter 91 and light receiver 92 surface-mounted on a board 81 and a sensor cover 82 attached to the board 81 as in the case of the first embodiment. The sensor cover 82 has two holes to which condenser lenses 83, 84 are fixedly attached so as to face the holes.

The sensor cover 82 is like a box having an opening in roughly the same shape as the board 81 and has the holes in a face opposite to the opening.

Light-shielding walls 101 are provided on both sides of the light emitter 91. One of the light-shielding walls 101 is located between the light emitter 91 and the light receiver 92. The light-shielding walls 101 can be independent components separated from the sensor cover 82 or can be integral parts of the sensor cover 82. In this embodiment, the light-shielding walls 101 are integrally formed with the sensor cover 82. The ends of the light-shielding walls 101 abut the board 81.

In the case where the light-shielding walls 101 are separately formed from the sensor cover 82, the light-shielding walls 101 are disposed so as to abut the sensor cover 82.

Two locking claws 102 are formed at opposite ends of the sensor cover 82. The two locking claws 102 press the board 81 to lock it from outside the light emitter 91 and light receiver 92 relative to the light-shielding wall 101 located between the light emitter 91 and light receiver 92, using the abutments between the light-shielding walls 101 and the board 81 as supporting points. According to this configuration, the amount of warpage at the opposite ends of the board 81 remains the same.

The two locking claws 102 press the board 81 to lock it at opposite end sides in the longitudinal direction of the board 81.

In the third embodiment, the optical system of the toner-amount detection sensor is designed so that light from the light emitter 91 enters toner 202 on the intermediate transfer belt 201 at a predetermine incident angle and the diffusely reflected light almost perpendicularly enters the light receiver 92.

Fourth Embodiment

A toner-amount detection sensor according to the fourth embodiment is used to detect specularly reflected light and diffusely reflected light.

Figure 7:
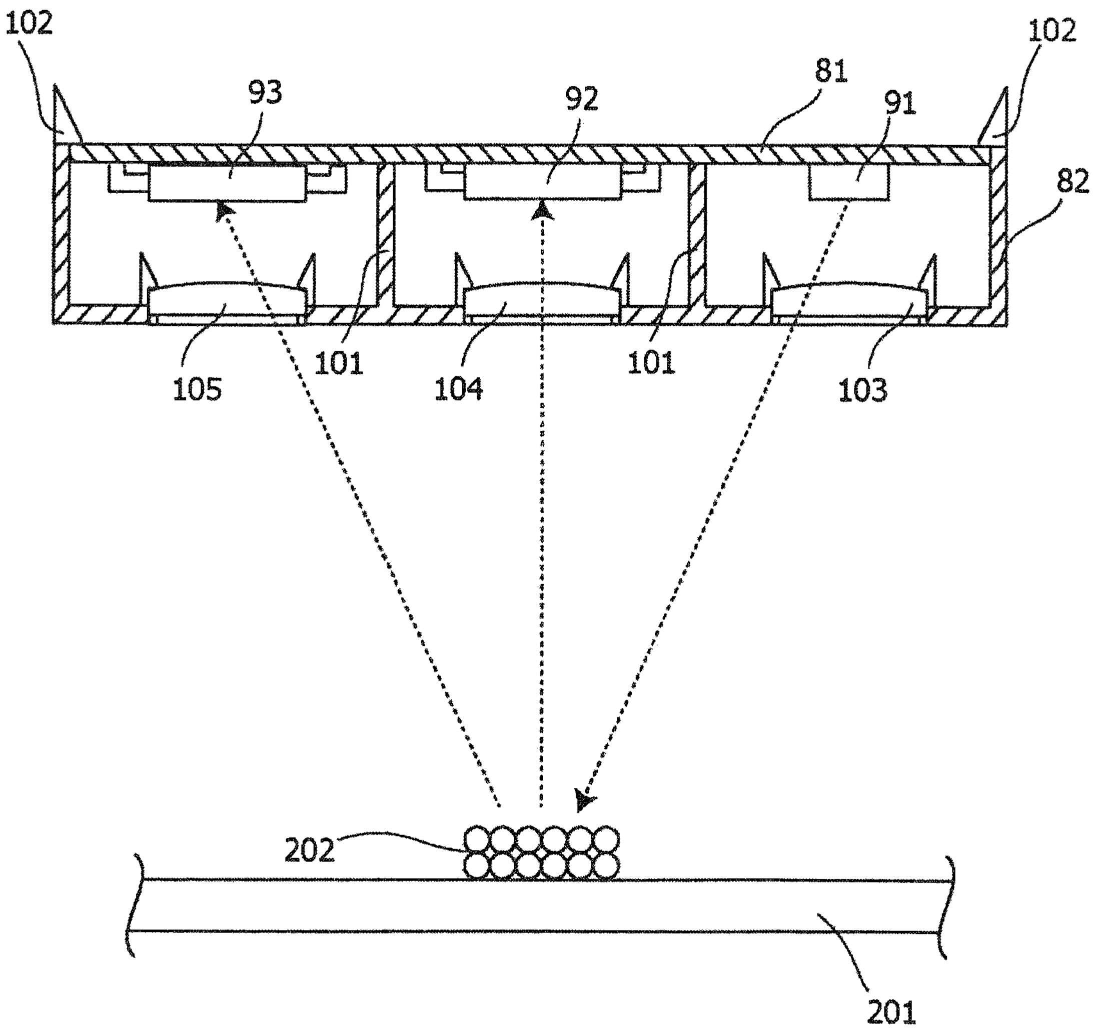
FIG. 7 is a cross-sectional view showing the configuration of a toner-amount detection sensor according to the fourth embodiment of the present disclosure.

FIG. 7 is a cross-sectional view showing the configuration of the toner-amount detection sensor according to the fourth embodiment of the present disclosure.

The toner-amount detection sensor according to the fourth embodiment is similar to the toner-amount detection sensor of the third embodiment, but is designed to further detect specularly reflected light.

As shown in FIG. 7, the toner-amount detection sensor of the fourth embodiment additionally includes a light receiver 93 that is surface-mounted on a board 81 in order to detect specularly reflected light and a condenser lens 105 that is fixedly attached so as to face another hole of a sensor cover 82. The light receiver 93 is equivalent to the light receiver 92.

One of the light-shielding walls 101 is located between the light receiver 92 and the light receiver 93.

The two locking claws 102 press the board 81 to lock it from outside the light emitter 91 and light receiver 93 relative to the two light-shielding walls 101, using the abutments between the two light-shielding walls 101 and the board 81 as supporting points.

The other configuration of the toner-amount detection sensor of the fourth embodiment is the same as that of the third embodiment, and therefore the explanation will not be reiterated.

Although the foregoing embodiments are examples of the present disclosure, it is to be noted that the present disclosure is not limited by the embodiments, and that various modifications and changes can be made without departing from the spirit of the present disclosure.

For example, the boards 1, 41, 81 in the foregoing first to fourth embodiments are locked at the opposite ends by the locking claws 22, 62, 102; however, the boards 1, 41, 81 can be locked by forming holes in the boards 1, 41, 81 at positions outside the light emitters 11, 51, 91 and/or light receivers 12, 52, 92, 93 relative to the light-shielding walls 21, 61, 101 and inserting the locking claws into the holes. In addition, although the locking parts are the locking claws 22, 62, 102, this disclosure is not limited to this, and the locking parts can be parts which can press the opposite ends of the board 1, 41, 81 to lock it.

In addition, the light receivers 12, 52, 92, 93 in the foregoing first to fourth embodiments are color sensor elements; however, other types of optical sensors can be used as the light receivers 12, 52, 92, 93.

What is claimed is:

1. A toner-amount detection sensor comprising:
- a board;
- a sensor cover;
- a light emitter that is surface-mounted on the board;
- a light receiver that is surface-mounted on the board;
- a light-shielding wall that is located between the light emitter and the light receiver, abuts the board, and abuts the sensor cover or extends from the sensor cover;
- two locking parts that are formed at opposite ends of the sensor cover and press the board to lock it from outside the light emitter and light receiver relative to the light-shielding wall, using the abutment between the light-shielding wall and the board as a supporting point; and
- two light receivers, including the aforementioned light receiver, that are surface-mounted on the board and two light-shielding walls, including the aforementioned light-shielding wall, wherein
- one of the two light-shielding walls is located between the light emitter and the light receiver, abuts the board, and abuts the sensor cover or extends from the sensor cover,
- the other light-shielding wall is located between the two light receivers, abuts the board, and abuts the sensor cover or extends from the sensor cover,
- one of the two light receivers receives specularly reflected light,
- the other light receiver receives diffusely reflected light, and
- the two locking parts press the board to lock it from outside the light emitter and one of the two light receivers relative to the two light-shielding walls, using the abutments between the two light-shielding walls and the board as supporting points.

2. The toner-amount detection sensor according to claim 1, wherein the two locking parts are two locking claws.

3. The toner-amount detection sensor according to claim 1, wherein the two locking parts press the board to lock it at opposite end sides in the longitudinal direction of the board.

4. The toner-amount detection sensor according to claim 1, wherein the light emitter and the light receiver are surface-mounted on the board by reflow soldering.

5. The toner-amount detection sensor according to claim 1, wherein the light receiver is a color sensor element.

* * * * *